United States Patent

Amano et al.

[11] Patent Number: 5,988,122
[45] Date of Patent: Nov. 23, 1999

[54] TWO-CYCLE ENGINE

[75] Inventors: Masashi Amano; Masami Takubo; Takaharu Kurosaki, all of Saitama, Japan

[73] Assignee: Honda Giken Kogyo Kabushiki Kaisha, Tokyo, Japan

[21] Appl. No.: 09/050,427

[22] Filed: Mar. 31, 1998

[30] Foreign Application Priority Data

Mar. 31, 1997 [JP] Japan ..................................... 9-098414
Apr. 3, 1997 [JP] Japan ..................................... 9-101021

[51] Int. Cl.[6] ...................................................... F02B 25/00
[52] U.S. Cl. ......................................................... 123/65 PE
[58] Field of Search ............................ 123/65 PE, 65 R, 123/65 P

[56] References Cited

U.S. PATENT DOCUMENTS

| | | | |
|---|---|---|---|
| 5,373,816 | 12/1994 | Asai et al. | 123/65 PE |
| 5,507,263 | 4/1996 | Yamazaki et al. | 123/65 PE |
| 5,697,332 | 12/1997 | Asai et al. | 123/65 PE |
| 5,709,177 | 1/1998 | Worth et al. | 123/65 PE |
| 5,829,394 | 11/1998 | Oike et al. | 123/65 PE |
| 5,839,408 | 11/1998 | Oike et al. | 123/65 PE |

Primary Examiner—Marguerite McMahon
Attorney, Agent, or Firm—Birch, Stewart, Kolasch & Birch, LLP

[57] ABSTRACT

To provide a structure for attaching exhaust control valves near exhaust ports in a two-cycle engine, the exhaust control valves variably controlling open areas of the exhaust ports. The cavity for receiving the exhaust control valves is formed near the upper edges of the exhaust ports on the cylinder block. The holder member is interposed between the cylinder block and the exhaust manifold, is attached to the pivot for supporting the exhaust control valves. A flange is provided for connection with the cylinder block. Therefore, the exhaust control valves are disposed near the upper edges of the exhaust ports. It is not necessary to form bearings on the cylinder block using a complicated process. Complicated parts such as bearings are collectively formed on the holder member that is independent and compact and easily machined. The pivot extends across the exhaust passages that are formed downwardly in order to detour around the pivot. A jet-propelled boat is provided with a saddle seat in which the power unit is neatly and compactly arranged in a limited space.

17 Claims, 13 Drawing Sheets

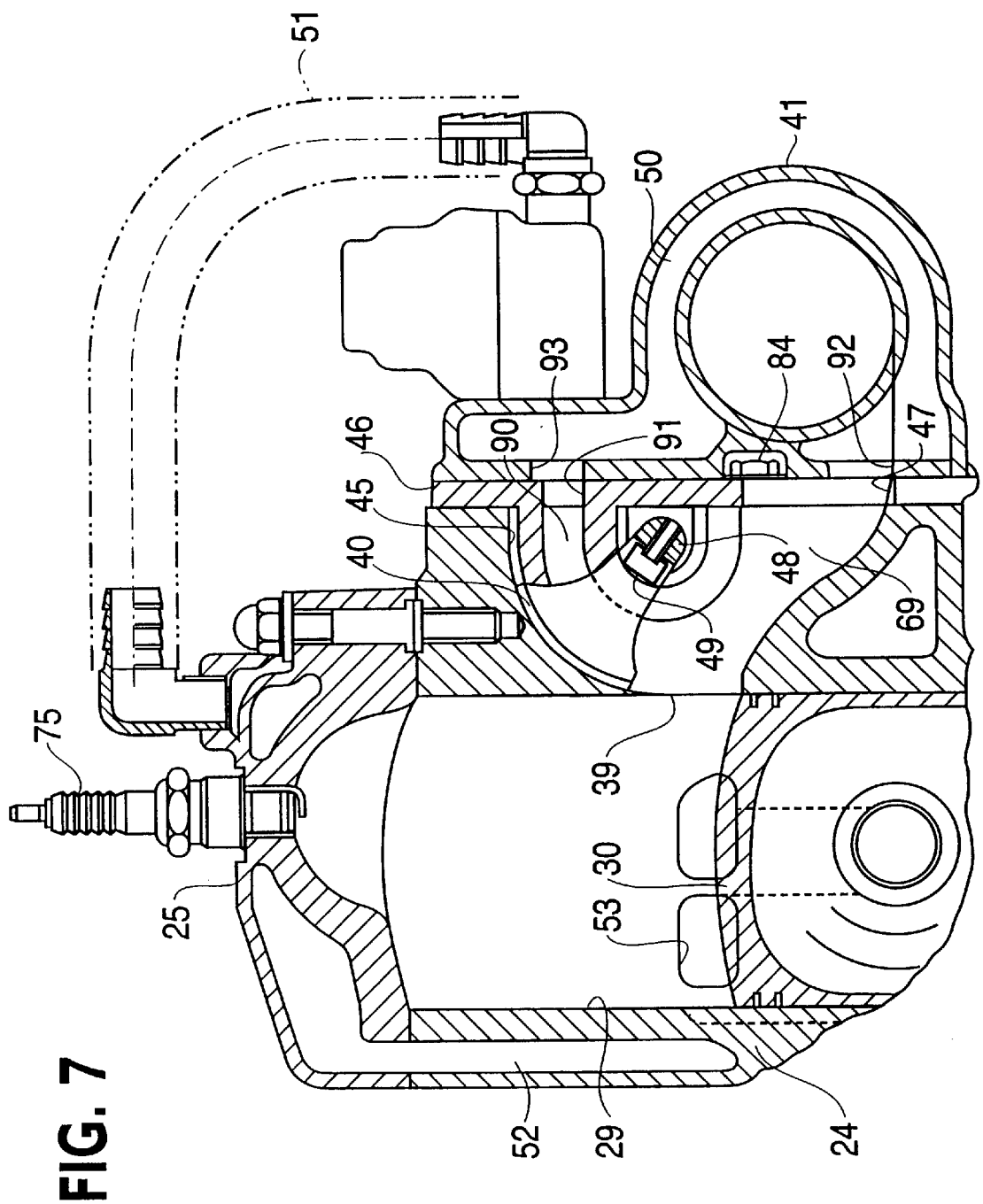

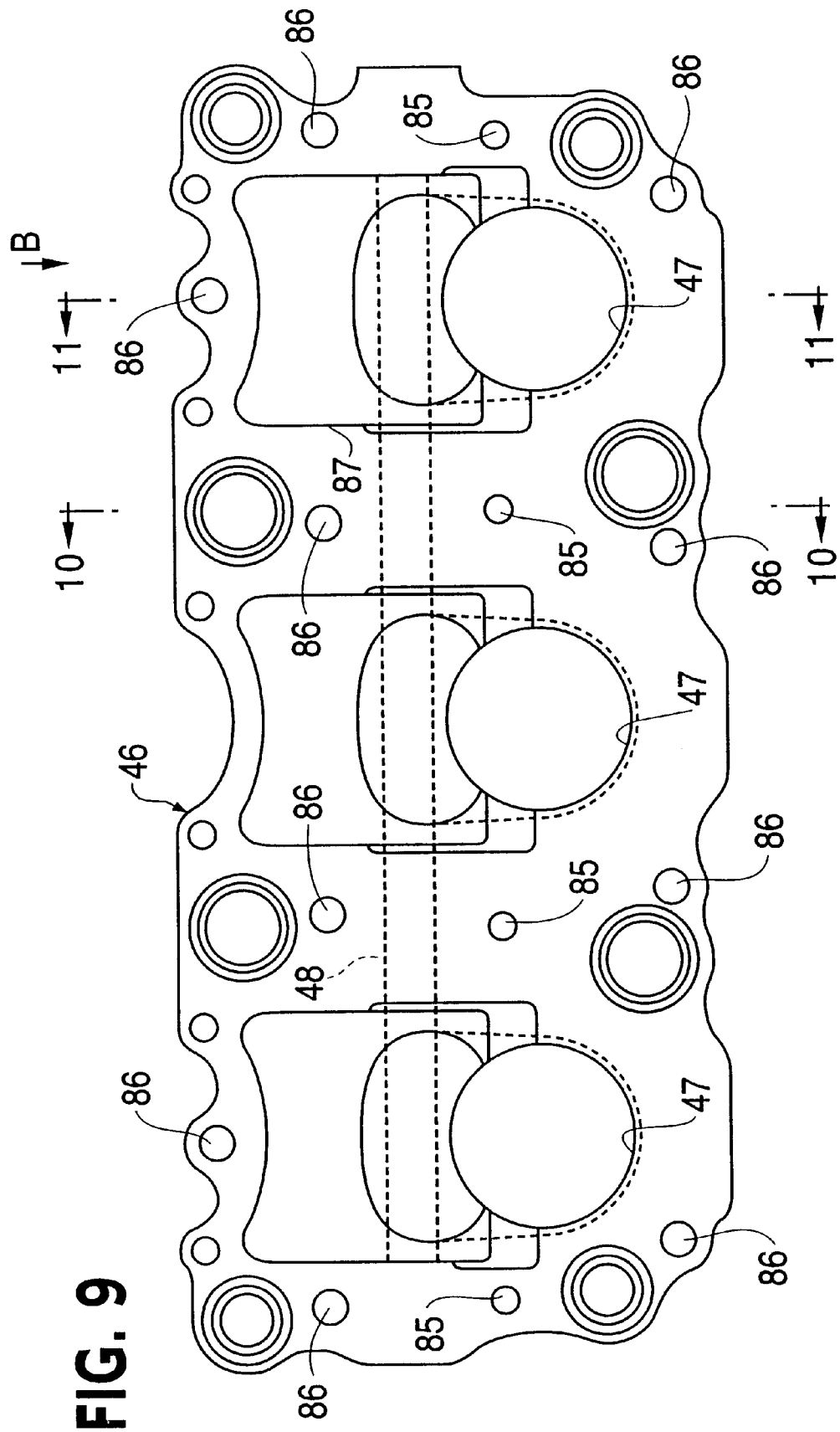

TWO-CYCLE ENGINE

BACKGROUND OF THE INVENTION

1. Field of the Invention

The present invention relates to a two-cycle engine including exhaust control valves for varying open areas of exhaust ports. More particularly, to a structure for mounting the exhaust control valves near the exhaust ports. In addition, the present invention relates to a small boat which is driven by a rider sitting astride a saddle seat, and more particularly to a small boat including a power unit neatly housed in a limited space thereof

2. Description of Background Art

The two-cycle engine has been known as an engine that is compact but can produce a high output because of its relatively simple structure and mechanism. This engine has been widely applied to motorcycles, small boats, and so on.

In this two-cycle engine, valves are disposed near exhaust ports, and are opened or closed in order to control exhaust gases, thereby enabling the engine to operate under optimum conditions.

For instance, the two-cycle engine disclosed in Japanese Patent Laid-Open Publication No. Hei 7-71279 or No. Hei 7-180556 includes exhaust control valves disposed on inner walls of exhaust passages near upper edges of exhaust ports in order to open or close the exhaust ports. When the engine is operating at a low speed or under a low load, the exhaust control valves substantially fully close the exhaust ports, optimally controlling pressure in the cylinders, activating fresh air in combustion chambers using thermal energy of already burnt gases remaining therein, realizing combustion in an active and hot atmosphere in which self-ignition combustion is carried out, and improving fuel economy and purification of exhaust gases.

Further, Japanese Patent Laid-Open Publication No. Sho 56-56915 exemplifies the two-cycle engine in which exhaust control valves for varying exhaust emission timing are positioned on inner walls of exhaust passages near upper edges of exhaust ports. When the engine is operating at a high speed, the exhaust control valves are fully opened to advance the timing for opening the exhaust ports (i.e., exhaust emission timing), thereby promoting discharge of exhaust gases. Conversely, when the engine is operating at a low speed, the exhaust control valves are nearly closed to retard the exhaust timing end prevent fresh air from blowing through the cylinders.

In the foregoing two-cycle engines, the exhaust control valves are supported by a pivot, are positioned near the upper edges of the exhaust ports, and are activated to vary the open areas of the exhaust ports.

Each exhaust control valve has an edge (i.e., the edge for opening or closing each exhaust port) which is in contact with an inner surface of the exhaust port. This means that the pivot for supporting the exhaust control valves should be positioned near the exhaust ports. If the pivot is positioned far from the exhaust ports, the exhaust control valves are subject to an increase in their turning radius, and suffer from reduced rigidity in their moving parts and an enlarged structure.

Various proposals have been made in order to rotatably position the exhaust control valves near the exhaust ports. For instance, Japanese Utility Model Publication No. Sho 57-12176 discloses the two-cycle engine, in which a cylinder block where exhaust ports are present comprises main and auxiliary cylinder block parts, and a pivot is disposed between these cylinder block parts in order to rotatably support the exhaust control valves near the exhaust ports.

However, in the foregoing two-cycle engines, the exhaust control valves are directly supported by the cylinder block where the exhaust ports are formed. Therefore, the two-cycle engines have a problem that the cylinder block should be subject to a complicated machining process of forming bearings and so on for receiving the pivot, so that it is difficult to attach the exhaust control valves to the cylinder block. Further, when the pivot is interposed between the cylinder block parts as in the last mentioned publication, the bearings should be precisely formed on surfaces of the cylinder block parts to be joined. This means reduced efficiency in manufacturing engines.

Since the exhaust control valves are exposed to hot exhaust gases, the bearings and so on should have a cooling member. However, such a cooling member is difficult to add because a structure for mounting the exhaust control valves becomes complicated.

Japanese Patent Laid-Open Publication No. Sho 62-35013 discloses the jet-propelled boat including an exhaust system, in which a first exhaust pipe communicating with an exhaust outlet of an engine is connected to an exhaust gas expanding chamber at its one end, and the exhaust gas expanding chamber is connected to an exhaust gas discharging outlet using a second exhaust pipe. The other end of the first exhaust pipe projects to the center of the exhaust gas expanding chamber, and extends substantially vertically in the boat. In other words, this jet-propelled boat prevents water, which enters into the exhaust gas expanding chamber via the exhaust gas discharging outlet because of sudden acceleration or waves, from entering into the engine via the first exhaust pipe.

The jet-propelled boat disclosed in Japanese Utility Model Laid-Open Publication No. Hei 5-27270 includes a valve which is interposed in an air intake path between an air inlet for introducing fresh air and an air inlet of an engine in order to open or close the air intake path. Further, the valve is interlocked to a float positioned outside the air intake path. When outside water enters into the boat, the float is lifted by the water to let the valve close the air intake path, thereby preventing the water from entering into the engine.

Various measures have been taken in order to protect the jet-propelled boat against water entering thereinto, as described above. Further, there has been a great demand for improving the ease of driving of such a small jet-propelled boat.

SUMMARY AND OBJECTS OF THE INVENTION

The present invention is conceived in order to overcome the foregoing problems of the related art, and is intended to provide a two-cycle engine that can mount exhaust control valves using an effective structure.

Further, the invention is intended to provide a two-cycle engine that has a simplified structure for mounting exhaust control valves, and improves the efficiency of manufacturing and assembling of the two-cycle engine.

In the two-cycle engine according to the invention, the cylinder block has the cavity for receiving the exhaust control valves at positions corresponding to the upper edges of the exhaust ports. The holder member is interposed between the cylinder block and the exhaust pipe communicating with the exhaust ports. The holder member is provided with a pivot for supporting the exhaust control valves and a flange for connection with the cylinder block and the exhaust pipe.

According to the invention, the cylinder block itself is formed with the relatively simple cavity for receiving the pivot, without any complicated process of making bearings for the pivot thereon. Relatively complicated parts are collectively formed on the holder member that is independent and compact, and is easily machined. Further, the holder member is positioned near the exhaust control valves and is attached via the pivot, so that the exhaust control valves and bearings can be cooled when a wafer jacket is formed on the holder member which can be easily processed.

The pivot is reliably attached to the holder member using holes formed thereon, compared with bearings formed on confronting surfaces of the cylinder block as in the related art. Further, the exhaust valves sub-assembled to the holder member are reliably attached near the upper edges of the exhaust ports simply by coupling the flange to the cylinder block and exhaust pipe.

In a preferred embodiment, the present invention is applied to a two-cycle engine in which a plurality of cylinders is arranged in parallel to one another. The pivot attached to the holder member extends across exhaust passages of the respective cylinders between the exhaust ports and the exhaust pipe. The exhaust passages are formed downwardly in order to detour the pivot. The exhaust control valves of the respective cylinders are supported by the pivot.

The present invention is advantageous as described above. Further, the exhaust passages are formed downwardly, thereby enabling the exhaust control valves of the respective cylinders to be supported by one pivot extending across the exhaust passages, using a simple structure. This arrangement prevents oil remaining in the exhaust pipe from returning to the cylinders.

The present invention is applicable to any two-cycle engine having exhaust control valves, regardless of the number of cylinders, e.g., a single or multiple cylinder engine.

The present invention is applicable not only to two-cycle engines including exhaust control valves for varying exhaust emission timing and two-cycle engines including exhaust control valves for performing the combustion under active and hot ambience but also to two-cycle engines in which exhaust control valves control open areas of exhaust ports in accordance with the temperature of exhaust gases (as disclosed in Japanese Patent Laid-Open Publication No. Hei 7-97912).

In order to overcome the foregoing problems of the related art, the present invention is conceived to provide a small boat with a saddle seat in which a power unit is effectively and neatly housed in a limited space therein.

Further, the invention is intended to provide a small boat with a saddle seat in order to protect a fuel pump and an engine control unit, which are sensitive to heat, against heat from the engine.

In accordance with the present invention, the small boat comprises a steering handle, and a saddle seat positioned behind the steering handle, and an engine housed in a space which is defined under the saddle seat and is substantially in the shape of an inverted cone. The engine is arranged upright with axes of cylinders oriented toward the apex of the space in the shape of an inverted cone. Further, air intake and exhaust systems are arranged near opposite sides of a cylinder block of the engine in the foregoing space, while an engine control unit and small accessories such as a starting motor, a fuel pump and so on are arranged near opposite sides of a crankcase of the engine.

The air intake system such as an air cleaner and the exhaust system such as an exhaust pipe which are relatively large are arranged near the opposite sides of the cylinder block (i.e., at an upper area of the foregoing space). Further, the accessories such as the starling motor, fuel pump and so on which are relatively small compared with the air cleaner and so on are arranged near the opposite sides of the crankcase, which are relatively small in the foregoing space (i.e., at the lower area of the space in the shape of an inverted cone). Thus, the limited space is effectively used to house the foregoing systems and accessories. In the two-cycle engine, the exhaust pipe is in the shape of a large exhaust chamber, so that the large space should be prepared for the exhaust pipe as described above.

According to the invention, the exhaust system that becomes relatively hot is positioned at the upper area of the foregoing space. On the other hand, the small accessories like the engine control unit, air clearer, and fuel pump which should be maintained at a relatively low temperature are positioned at the lower part of the forgoing space. This arrangement is effective in promoting convection of air in the space, and preventing the fuel pump from being extensively heated. Further, the lower part of the space is present near the surface of the water, so that the engine control unit and fuel pump are kept relatively cool by the water surrounding the space.

Further, the exhaust system including the exhaust pipe, and the fuel pump and the engine control unit are arranged in a staggered state on opposite sides of the engine that is sandwiched therebetween. Therefore, heat radiated from the exhaust system can be shielded by the engine, which protects the fuel pump and the engine control unit against heat.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a cross-sectional view of the exhaust system showing the structure for attaching the exhaust control valve in the embodiment;

FIG. 9 is a front view of the holder member observed from the side of the cylinder block in the embodiment;

DETAILED DESCRIPTION OF THE PREFERRED EMBODIMENTS

A two-cycle engine according to the present invention will be described with reference to one embodiment shown in the accompanying drawings.

In this embodiment, the invention is applied to a two-cycle, three-cylinder engine for a jet-propelled boat on which an operator sits astride, as disclosed in Japanese Patent Laid-Open Publication No. Sho 62-59194 or No. Hei 5-246385.

Figure 1:
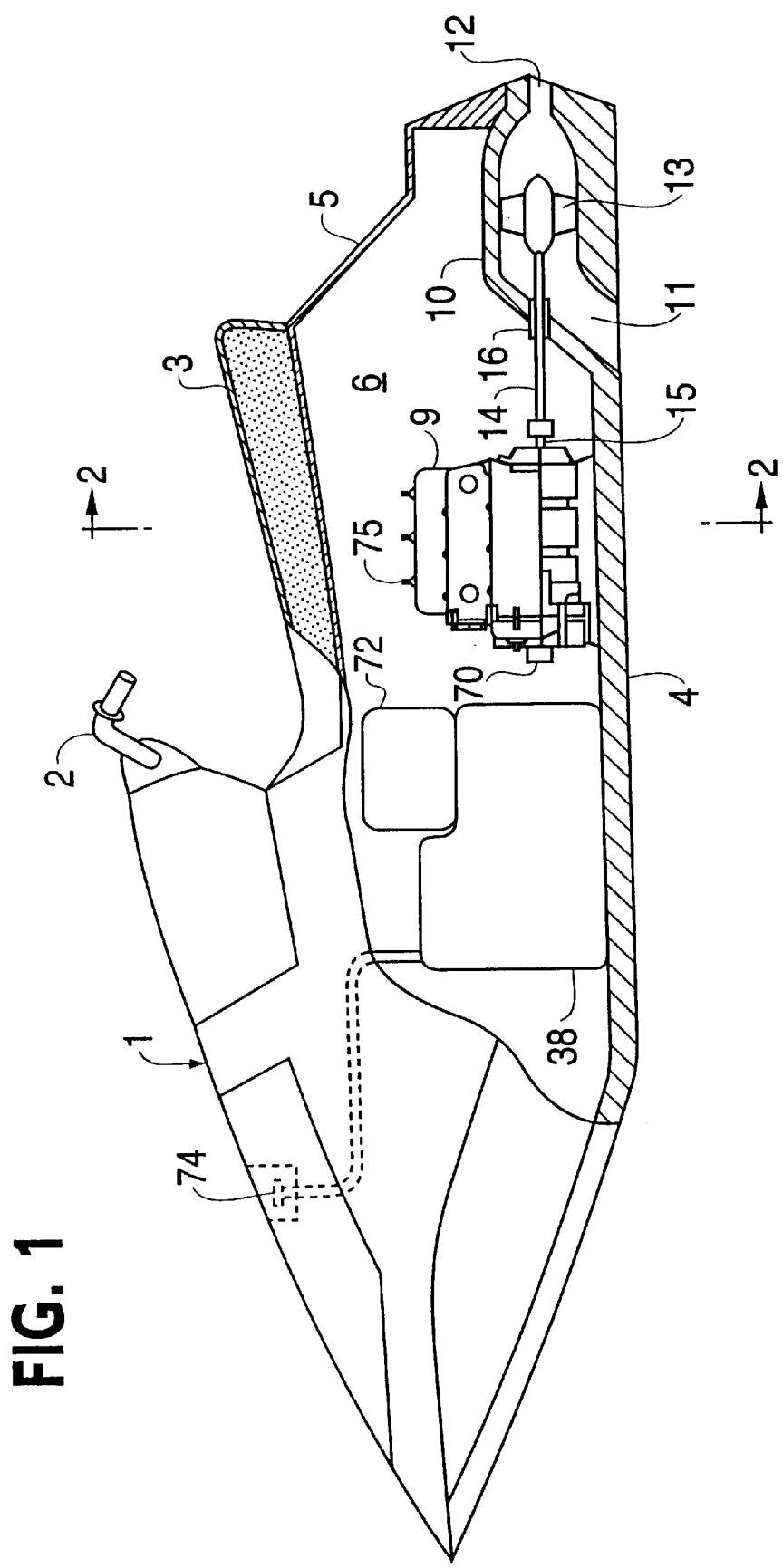
FIG. 1 is a side and partial cross-sectional view, of the jet-propelled boat to which one embodiment of the invention is applied.
Figure 2:
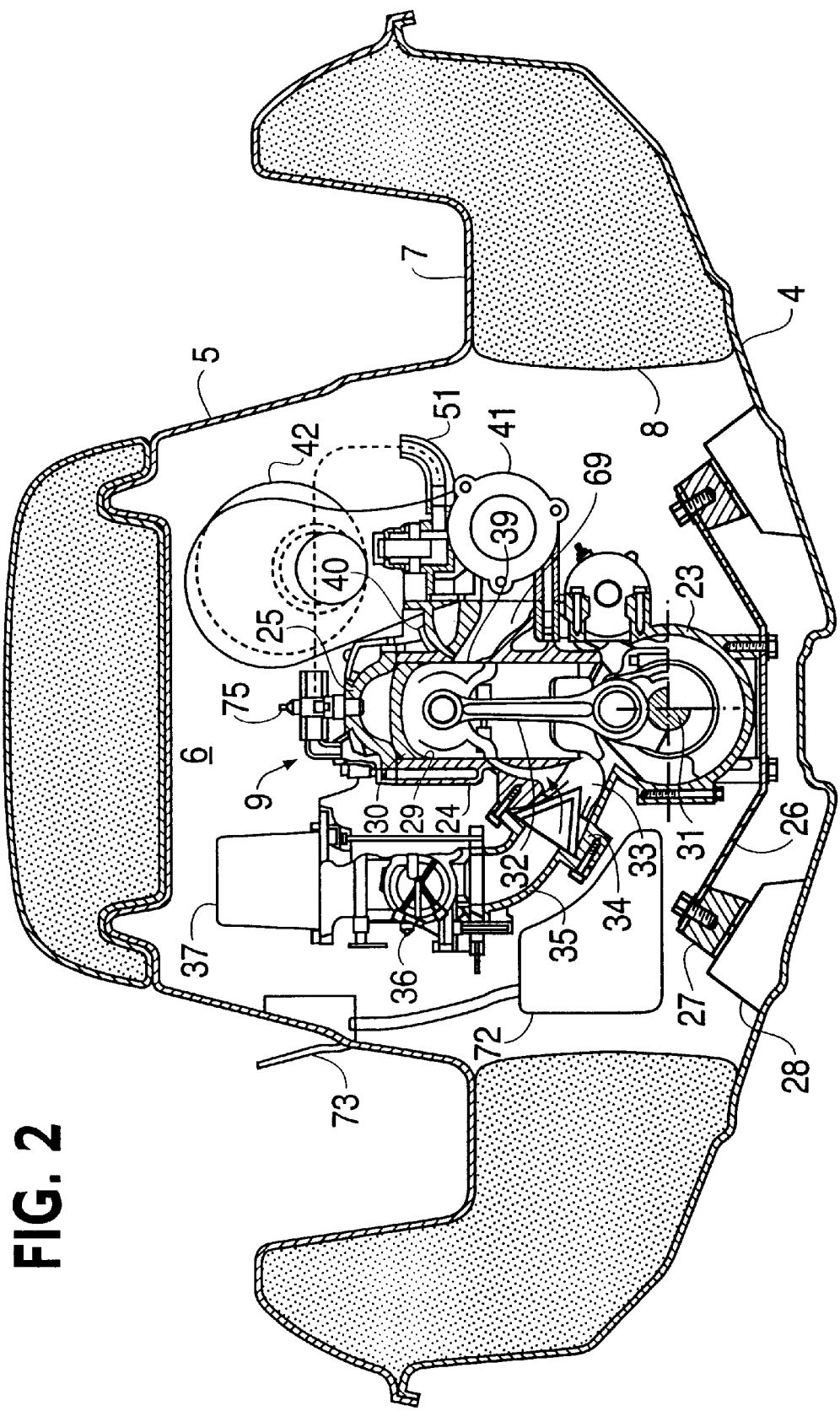
FIG. 2 is a cross-sectional view observed in the direction of arrow 2—2 in FIG. 1.

As shown in FIGS. 1 and 2, the jet-propelled boat 1 includes a steering handle 2 substantially at its center, and a seat 3 in the shape of a saddle which is behind the steering handle 2. The operator sits astride the seat 3 with his or her feet positioned on footrests 7, shown in FIG. 2, and operates the steering handle 2 in order to propel the boat.

The boat 1 comprises a lower panel 4 and an upper panel 5 that are made of reinforced plastic (FRP) or the like, and are joined from both upper and lower sides. A vacant space 6 is defined by the upper and lower panels, so that the boat 1 has a buoyant structure. The footrests 7 are positioned at opposite sides of the seat 3 on the upper panel 5. A part of the space 6 under the footrest 7 houses a buoyant float 8.

A power unit mainly comprising a two-cycle engine 9, is housed in the space 6 in the boat 1. More specifically, the space 6 for housing the engine 9 is defined under the seat 3, and is relatively narrow in view of the center of gravity for assuring a good steering feeling and a positional relationship with a jet propeller 10 which is present at a rear end of the boat 1.

The jet propeller 10 forms a channel from a water inlet 11 on a bilge of the boat to a jet nozzle 12 which opens at the rear end of the boat, and houses an impeller 13 which is rotatable in the channel. The impeller 13 is connected to an output shaft 15 of the engine 9 via a drive shaft 14. In FIG. 1, a sealing member 16 is provided for maintaining the drive shaft 14 in a water-tight manner and enabling the drive shaft 14 to be freely rotatable.

When the engine 9 rotates the impeller 13, water introduced via the water inlet 11 is ejected, with a gush, via the jet nozzle 12, thereby propelling the boat 1 forward.

The engine is a two-cycle engine in which three cylinders are arranged in parallel with one another with respect to a crankshaft. The engine 9 is housed in the space 6 which is substantially in the shape of an inverted cone, and is present under the seat 3, with the crankshaft extending forwardly and rearwardly along the length of the boat 1, and the axes of the cylinders are oriented toward the apex of the bilge in the shape of an inverted cone.

The engine 9 is mounted in the boat I in the following manner. A cylinder block 24 and a cylinder head 25 are stacked on a crankcase 23 one on top of the other so as to form one integral unit. The crankcase 23 is attached to an engine hanger 26, which is engaged via a mounting block 27 with bosses 28 formed on the lower panel 4.

Figure 3:
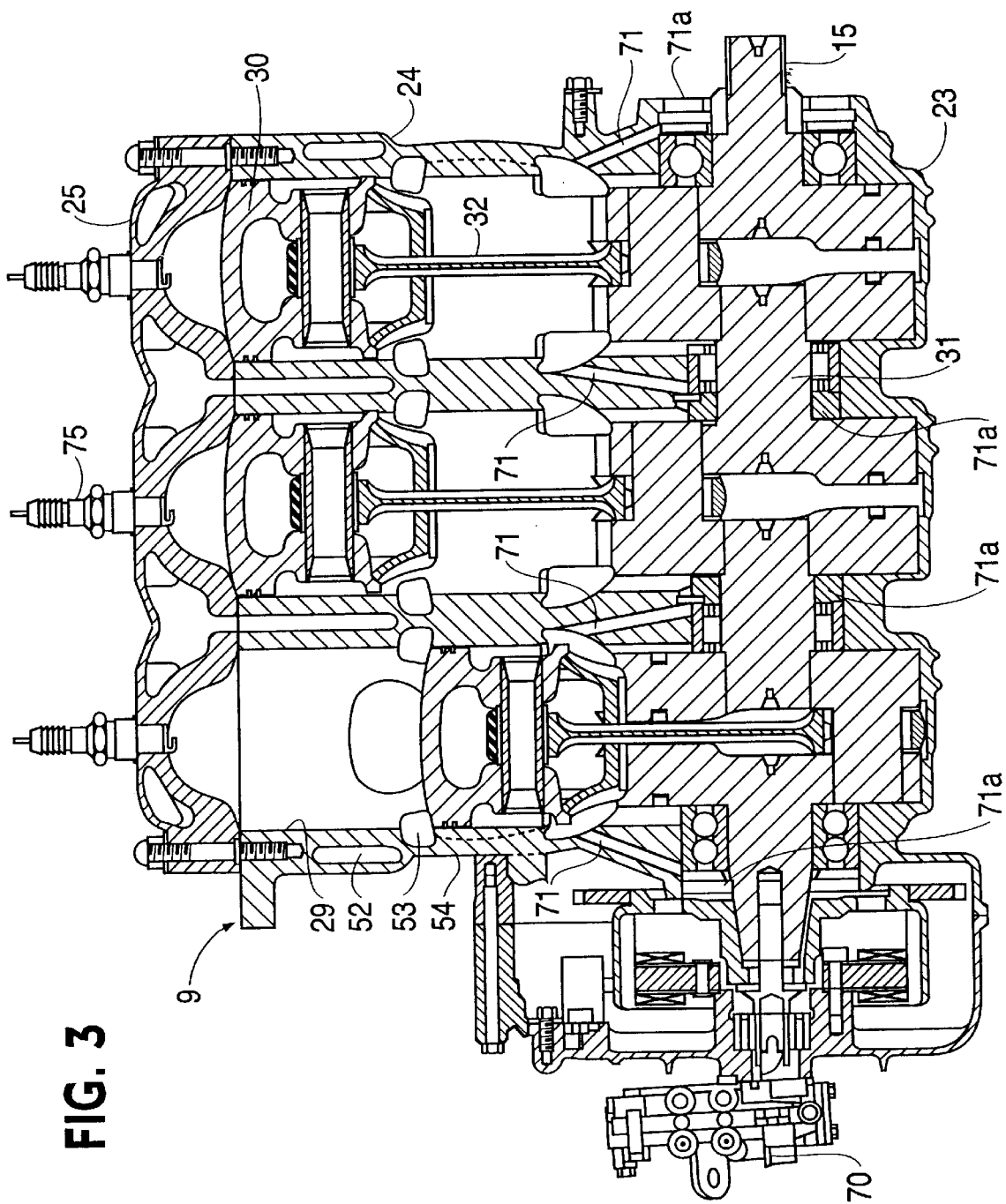
FIG. 3 is a longitudinal cross-sectional view of the two-cycle engine to which the invention is applied.
Figure 4:
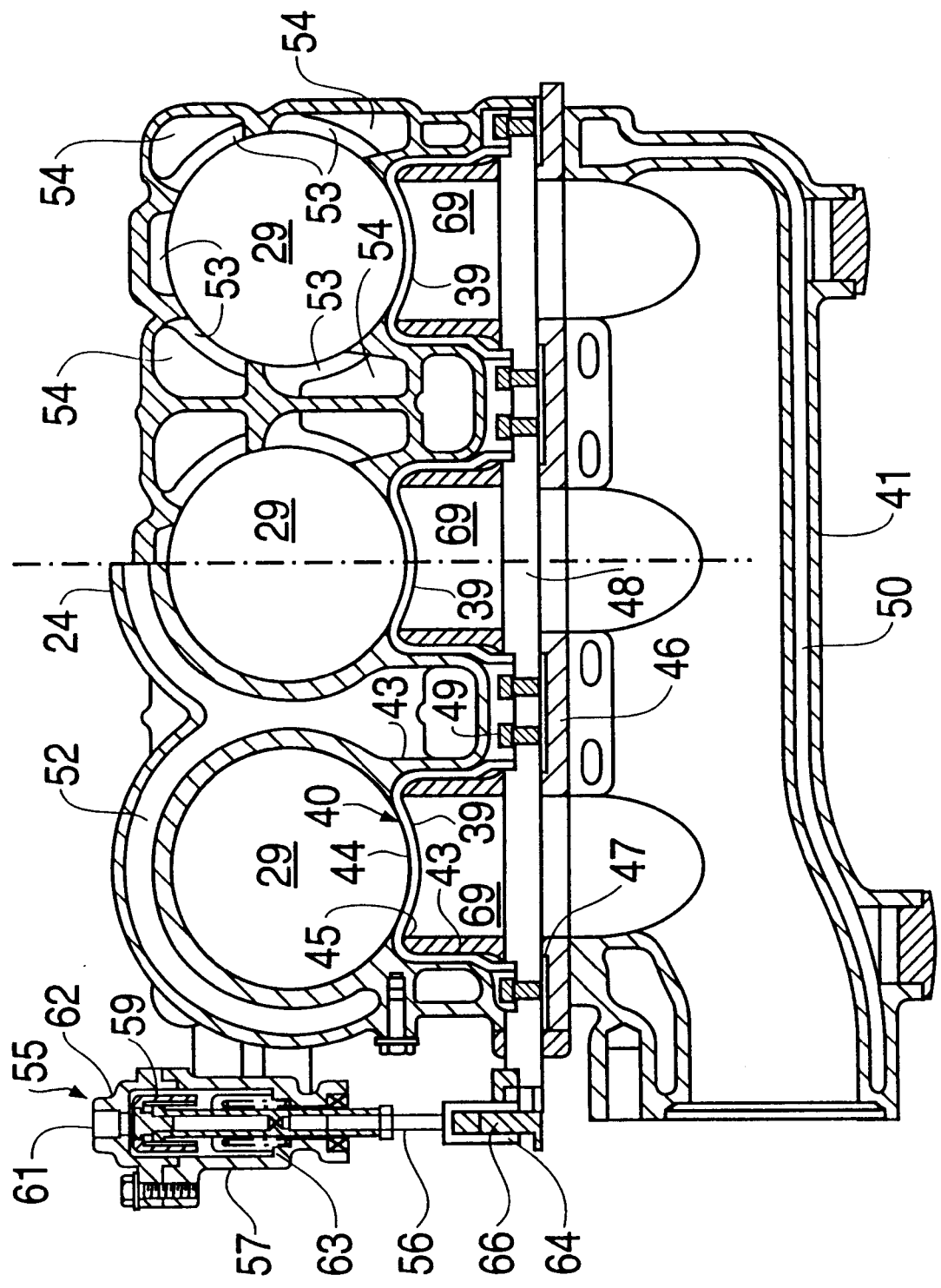
FIG. 4 shows a lateral cross section and a plan view of the two-cycle engine in the embodiment.

Referring to FIGS. 3 and 4, pistons 30 are slidably fitted in three cylinder holes 29, on the cylinder block 24. Each piston 30 is coupled to the crankshaft 31 via a connecting rod 32. The crankshaft 31 is rotated in response to the upward and downward movements of the pistons 30 so that rotating force of the crankshaft 31 is transmitted from the output shaft 15 in order to rotate the impeller 13.

Air intake ports 33 are formed on one side of the cylinder 24 (i.e., on the left side in FIG. 2), and are provided for the respective cylinders. The air intake ports 33 include reed valves 34 therein, and are connected to carburetors 36 via an intake manifold 35. An air cleaner 37 is positioned upstream of the carburetors 36. Fuel is supplied to the carburetors 36 from a fuel tank 38.

The operation of a throttle lever (not shown) connected to the steering handle 2 controls an opening amount of the throttle valves of the carburetors 36, and allows the air from the air cleaner 37 to be mixed with the fuel in the carburetors 36. An air-fuel mixture is then supplied to the crankcase 23 via the reed valves 34 and the intake manifold 35.

Exhaust ports 39 are provided on the other side of the cylinder block 24 (i.e., on the right side in FIG. 2), and are provided for the respective cylinders. Exhaust control valves 40 are provided in the exhaust ports 39. The exhaust control valves 40 are positioned near the exhaust ports confronting the cylinder holes 29. The exhaust control valves 40 are capable of swinging and are activated by a cylinder device in accordance with a speed of the jet boat as described later. Each exhaust control valve 40 controls an open area of each exhaust port 39 in order to enable the exhaust port 39 to discharge exhaust gases most efficiently in accordance with the operation of the jet boat. Specifically, the exhaust ports 39 are closed in order to promote combustion under active and hot ambience when the jet boat is running at a low speed or under a low load, thereby improving fuel economy and promoting exhaust gas purification.

The exhaust ports 39 are connected to an exhaust manifold (exhaust pipe) 41, and are collectively connected to an exhaust chamber 42 via the exhaust manifold 41. The exhaust chamber 42 is connected to a muffler (not shown) at the rear end of the boat. Exhaust gases from the exhaust ports 39 are discharged out of the boat 1 via the exhaust manifold 41, exhaust chamber 42, and the muffler.

In this embodiment, the exhaust manifold 41 opens toward the bow of the boat 1 (to the left in FIG. 1), and the exhaust chamber 42 is connected to an open end of the exhaust manifold 41. The exhaust chamber 42 is folded upwardly, and then extends rearwardly to come into contact with the muffler.

Referring to FIG. 4, each exhaust control valve 40 comprises a pair of plates 43 substantially in the shape of a sector and a valve plate 44 having a cross section is in the shape of an arc. Each plate 43 is coupled to the valve plate 44 at its edges. Each exhaust control valve 40 is received in a cavity 45 which is positioned along the upper edges of the exhaust ports on the cylinder block 24, and is in the shape of an arc in a longitudinal cross section.

A holder member 46 for supporting the exhaust control valves 40 is interposed and fixed between the cylinder block 24 and the exhaust manifold 41. The holder member 46 has through-holes 47 for enabling the exhaust ports 39 to communicate with the exhaust manifold 41. Further, the holder member 46 rotatably supports a pivot 48 extending between the cylinders. Bases of the plates 41 of the exhaust control valves 40 are fixed to the pivot 48 using small screws.

The axial rotation of the pivot 48 supporting the exhaust control valves 40 enables opening and closing of the exhaust control valves 40, so that an opening ratio of the exhaust ports 39 is variable between substantially full closed and substantially full open.

A structure for mounting the exhaust control valves 40 will be described later in detail with reference to FIGS. 7 to 11.

In this embodiment, the exhaust passages 69 extend across the juxtaposed direction of the cylinders, and the exhaust control valves 40 are arranged in the same direction as the juxtaposed direction of the cylinders. The exhaust control valves 40 are supported by the pivot 48, and are capable of swinging thereon. The plane containing the swinging orbit of the exhaust control valves 40 is parallel with the direction in which the exhaust ports 39 open, which is effective in reliably controlling the opening and closing of the exhaust ports 39.

Referring to FIG. 4, the exhaust manifold 41 is provided with a water jacket 50 through which cooling water flows. Further, the cylinder block 24 also includes a water jacket 52 communicating with the water jacket 50 via a pipe 51 in order to introduce the cooling water. The holder member 46 also includes a water jacket communicating with the water jacket 50 in order to introduce the cooling water, as will be described later with reference to FIG. 7.

Five scavenging ports 53 are formed above the cylinder holes 29, with each scavenging port 53 communicating with an interior of the crankcase 23 via scavenging paths 54 longitudinally passing through the cylinder block 24.

The two-cycle engine performs the scavenging operation in the following manner. Specifically, the air-fuel mixture supplied to the crankcase 23 is compressed by the downward movement of the pistons 30, and is supplied under pressure to the combustion chambers of the cylinders via the scavenging paths 54 and the scavenging ports 53.

Referring to FIG. 4, the cylinder device 55 is attached to an outer side wall of the cylinder block 24, and has a tip of its piston rod 56 coupled to the pivot 48 of the exhaust control valves.

Figure 5:
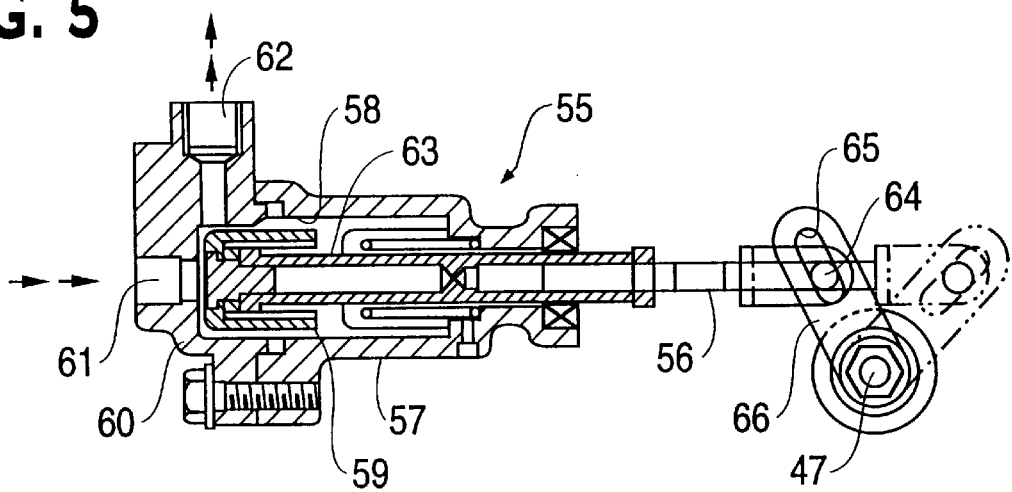
FIG. 5 is a cross-sectional view of the exhaust valve operating mechanism in the embodiment of the invention.

The cylinder device 55 comprises a piston 59 housed in a cylinder body 57 via a diaphragm so as to swing freely, as shown in FIG. 5. A piston rod 56 projecting from the cylinder body 57 is attached to the piston 59.

The cylinder body 57 is provided with an intake port 61 for supplying liquid to a pressure chamber which confronts a pressure receiving area of the piston 59, a discharge port 62 for discharging the liquid from the pressure chamber, and a return spring 63 for urging the piston 69 against water pressure from the pressure chamber. Therefore, when the water pressure above a predetermined value is applied to the pressure chamber, the piston 59 moves against the return spring 63 to impart movement to the piston rod 56. Conversely, when the water pressure is reduced belong the predetermined value, the piston 59 retracts the piston rod 56 in response to the resilience of the return spring 63.

The piston rod 56 is coupled at its tip to a lever 66 attached to one end of the pivot 48, so that the lever 64, as well as the pivot 48, is rotated in response to the movement of the piston rod 56. In other words, if the water pressure exceeding the predetermined value is applied to the pressure chamber and the piston rod 56 is imparted with movement, the lever 66 is rotated to enable the exhaust control valves 40 to fully open the exhaust ports 39. Conversely, if the water pressure is reduced below the predetermined value and the piston rod 56 is retracted, the lever 66 is rotated in a reverse direction, and the exhaust control valves 40 substantially fully close the exhaust ports 39.

Figure 6:
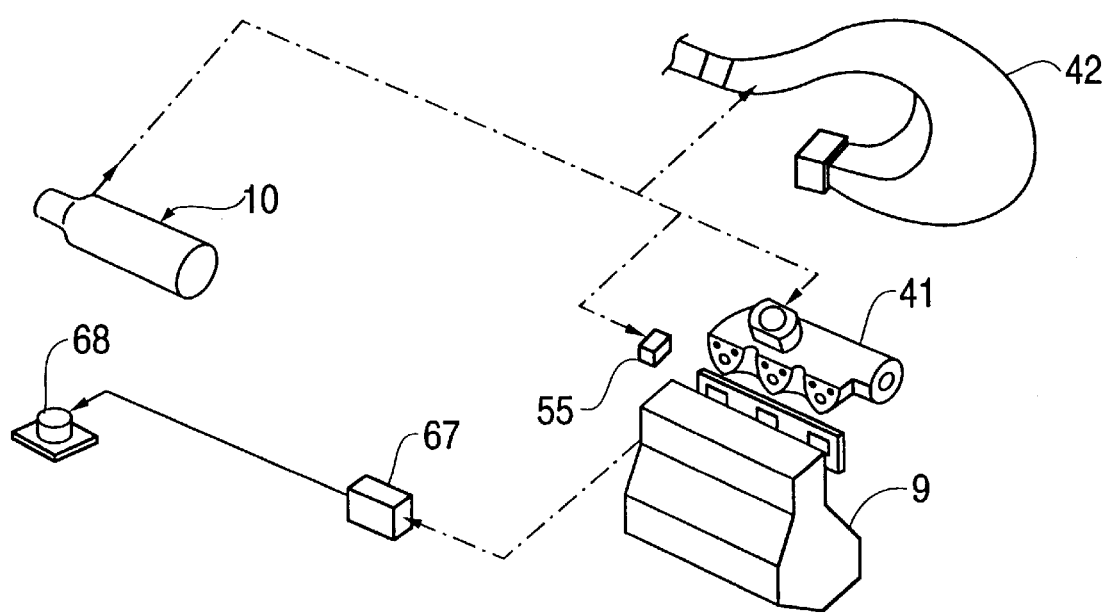
FIG. 6 shows the route for supplying the cooling water in the embodiment.

In this embodiment, water pressurized by the jet propeller 10 is supplied to the pressure chamber of the cylinder device 55, as shown in FIG. 6. The faster the impeller 13 is rotated, the higher the pressure of the water is raised, so that the exhaust control valves 40 are operated to fully open the exhaust ports 39 (i.e., 100%). Conversely, if the impeller 13 is rotated at a moderate speed (i.e., when the engine is operating at a low speed or under a low load), the pressure of the water applied to the pressure chamber is relatively low. In this state, the return spring 63 urges the exhaust control valves 40 to close, thereby substantially closing the exhaust ports 39, and allowing the engine to perform combustion in the active and hot ambience.

In FIG. 6, a thermal sensor casing 67 is provided and is connected to a drain plug 68 for discharging the cooling water out of the jet boat.

As shown in FIG. 3 in detail, the engine 9 is a two-cycle engine having a separate oil supply system. An oil pump 70 is connected to one end of the crankshaft 31 of the engine 9. When activated in response to the rotation of the crankshaft 31, the oil pump 70 supplies pressurized lubricating oil from a lubricating oil tank 72 to respective parts of the engine 9 via oil paths 71 or the like formed in the cylinder block 24 and so on. The oil paths 71 communicate with bearings of the crankshaft 31 that are positioned inside the oil sealing members 71a. When returning via the scavenging paths 54, some of the lubricating oil enters into the oil paths 71 to lubricate the bearings of the crankshaft.

In FIG. 2, an oil lid 73 is provided for supplying the lubricating oil to the lubricating oil tank 72. In FIG. 1 a fuel lid 74 is provided for closing a fuel passage for supplying the fuel to the fuel tank 38. In FIGS. 1 and 3, spark plugs 75 are provided for the respective cylinders, and used to ignite the compressed gas in the combustion chambers.

The structure for attaching the exhaust control valves 40 is shown in detail in FIG. 7. The holder member 46 is interposed between the cylinder block 24 and the exhaust manifold 41. The exhaust control valves 40 are supported by the holder member 46 via the pivot 48.

Figure 8A:
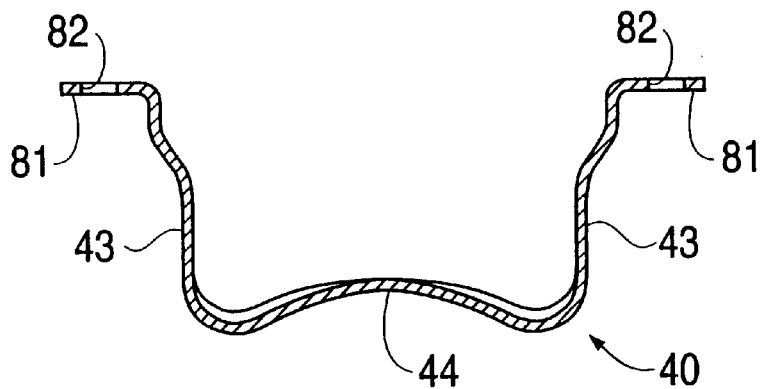
FIG. 8($a$) is a cross-sectional view of the holder member in the embodiment.
FIG. 8(b) is a side view thereof.
FIG. 8(c) is a front view thereof.
Figure 8B:
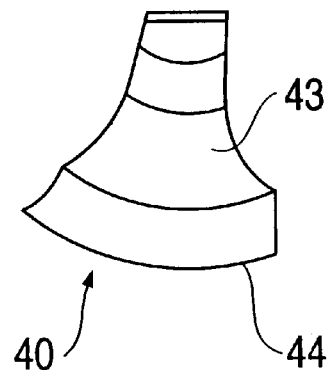
Figure 8C:
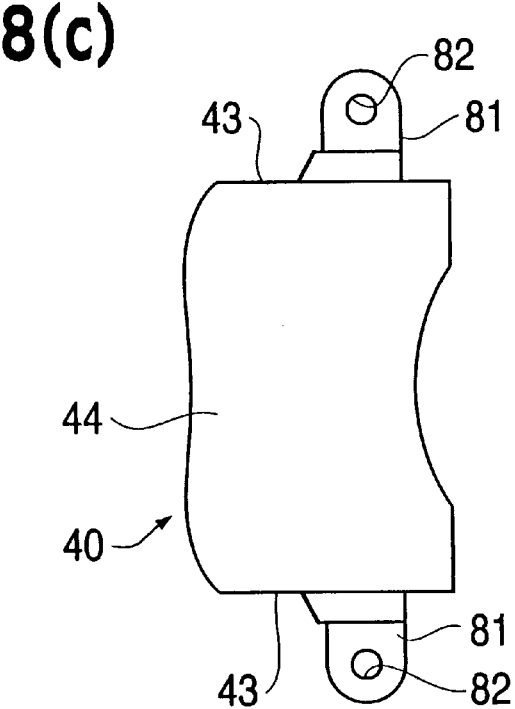

FIGS. 8(*a*), 8(*b*) and (8*c*) show a top plan view, a side view, and a front view, respectively, of each exhaust control valve 40. Specifically, the exhaust control valve 40 comprises a pair of plates 43 substantially in the shape of a sector and a valve plate 44 whose cross section is in the shape of an arc. Each plate 43 is coupled to the valve plate 44 at its edges. The valve plate 44 moves up and down in each exhaust port 39 in response to the rotation of the exhaust control valve 40 to control an open area of the exhaust port 39. Bases of the plates 43 have a flange 81, so that the exhaust control valve 40 is fixed to the pivot 48 using small screws via holes 82 formed on the flange 81.

Figure 10A:
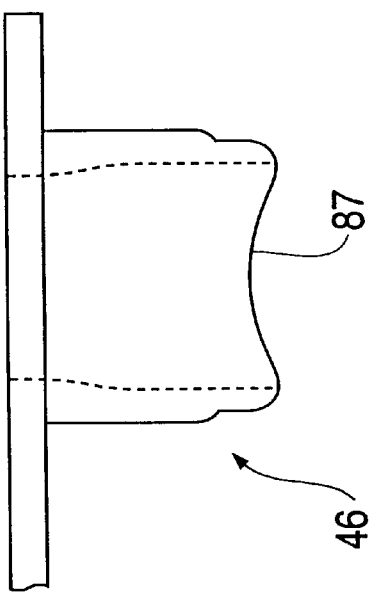
FIG. 10(a) shows the holder member in the embodiment, observed in the direction of arrow B in FIG. 9.
Figure 10B:
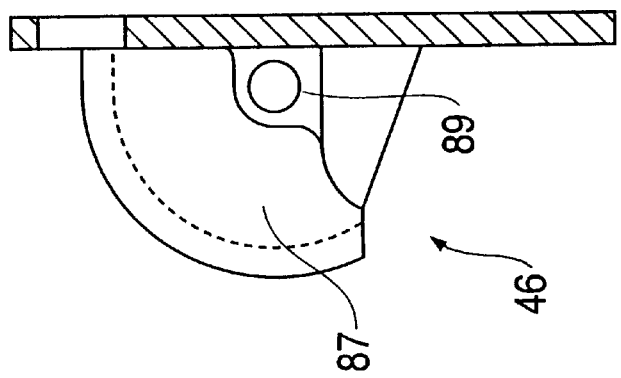
FIG. 10(b) is a cross-sectional view observed in the direction along line 10—10 in FIG. 9.
Figure 10C:
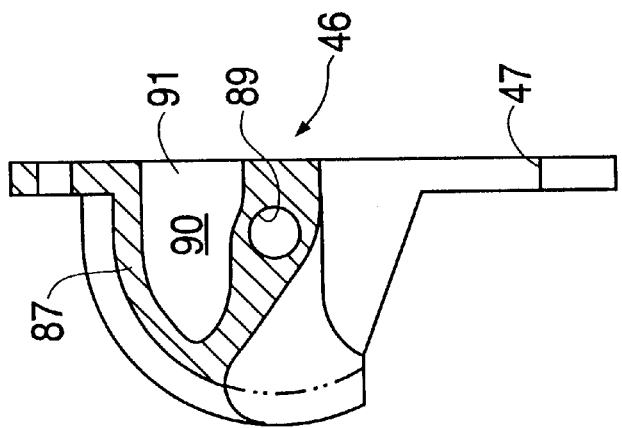
FIG. 10(c) is cross-sectional view observed in the direction along line 11—11 in FIG. 9.

Referring to FIGS. 9 and 10(*a*) to 10(*c*), the holder member 46 has, on its flat body, through-holes 47 for establishing communication between the exhaust passages 69 and the exhaust manifold 41, through-holes 85 for attaching the holder member 24 together with the exhaust manifold 41 to the cylinder block 24 using bolts, and through-holes 86 for attachment to the cylinder block 24 using bolts (not shown). The part of the holder member 46 where the through-holes 85 and 86 are formed is a flange for establishing an air-tight connection of the holder member 46 with the cylinder block 24 and the exhaust manifold 41.

Bearings 87 in the shape of a saddle are formed over the through-holes 47, and serve for the respective exhaust control valves 40. The pivot 48 is rotatably supported in holes 89 formed on the bearings 87. In other words, the exhaust control valves 40 are arranged over the bearings 87, and are attached to the pivot 48 that is rotatably supported in the holes 89 of the bearings 87.

A water jacket 90 is formed in the bearings 87. The holder member 46 is provided with a through-hole 91 on its body in order to let the water jacket 90 communicate with the surface where the holder member 46 joins with the exhaust manifold.

Figure 11:
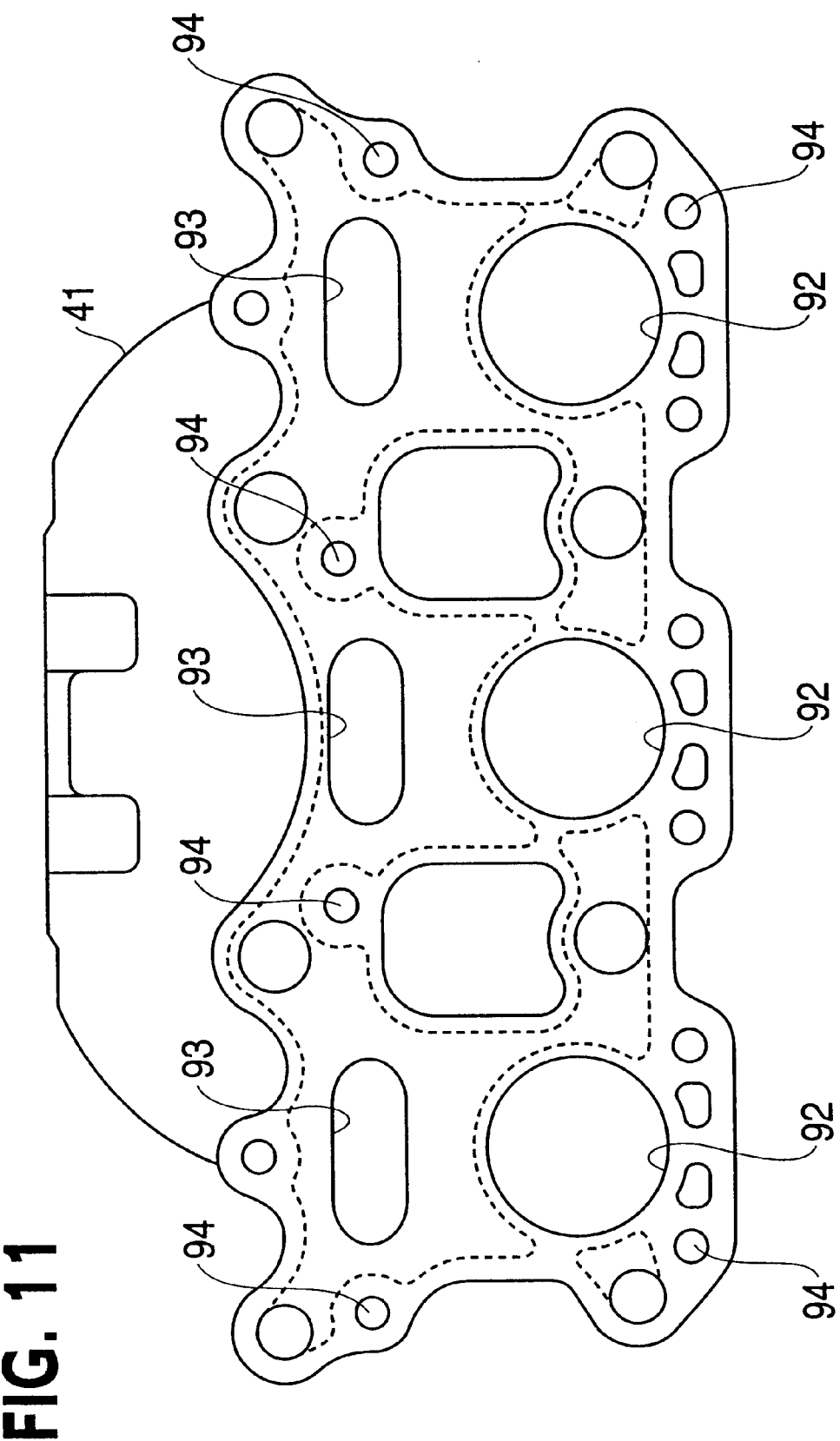
FIG. 11 is a front view of the exhaust manifold in the embodiment, observed from the holder member.

As shown in FIG. 11, the exhaust manifold 41 has through-holes 92 communicating with the exhaust passage, so that the exhaust manifold 41 and the holder member 46 are commonly fastened to the cylinder block 24. Thus, the exhaust passage of the exhaust manifold 41 communicates with the exhaust passages 69 of the cylinder block via the through-holes 47 and 92.

The exhaust manifold 41 has a through-hole 93 to communicate with its own water jacket 50. When the exhaust manifold 41 and the holder member 46 are fastened to the cylinder block 24, the water jacket 50 of the exhaust manifold communicates with the water jacket 90 of the holder member 46 via the through-holes 93 and 91. As a result, the cooling water supplied to the water jacket 50 of the exhaust manifold is introduced to the water jacket 90 of the bearings 87, thereby preventing the bearings for the pivot 48 and the exhaust control valves 40 from being extensively heated.

The exhaust manifold 41 has bolt holes 94 for its attachment to the cylinder block 24. The exhaust manifold 41 and the holder member 46 are fastened together using bolts (not shown) passing through the bolt holes 94 and the holes 86 on the holder member, and are attached to the cylinder block 24.

Referring to FIG. 7, the exhaust passages 69 extending from the exhaust ports 39 extend downwardly toward the exhaust manifold 41 in order to detour or circumvent the upper edge of the exhaust ports 39. Therefore, the pivot 48 can be arranged across the exhaust ports 39. Further, residual lubricating oil discharged from the combustion chambers via the exhaust ports 39 reliably flows to the exhaust manifold 41, thereby preventing the lubricating oil from returning back to the combustion chambers. This enables the pivot 48 to be commonly used for the exhaust control valves 40, which simplifies the structure for supporting the exhaust control valves 40, facilitates assembling of the engine 9 and efficiently promotes the combustion.

The foregoing jet-propelled boat is driven by the operator who sits astride the seat 3 with his or her feet on the footrests 7 and operates the steering handle 2.

Under the normal operation of the jet boat, except for the operation at a low speed or under a low load, the exhaust control valves 40 maintain the exhaust ports 39 fully open. The engine repeatedly performs the two-stroke processes and rotates the impeller 13 at a high speed, as follows. The air-fuel mixture is supplied to the crankcase 23 via the intake ports 33, is supplied to the combustion chambers via the scavenging ports 54 in response to the downward movement of the pistons 30, is compressed by the upward movement of the pistons 30, is ignited by the spark plugs 75, and is burnt. Burnt gases are then scavenged from the exhaust ports 39 in response to the downward movement of the pistons 30.

On the other hand, if the impeller 13 is rotated at a low speed when the engine is operating under a low load, the exhaust control valves 40 substantially fully close the exhaust ports 39, and the engine keeps on performing combustion under the active and hot ambience, thereby improving the fuel economy and purification of exhaust gases at the low speed or under the low load.

The exhaust control valves 40 turn on the pivot 48 that is orthogonal with the opening direction of the exhaust ports 39. This is effective in reliably controlling the opening and closing of the exhaust ports 39.

The exhaust control valves 40 are assembled to the engine 9 in the following manner. They are fitted into the bearings 89 of the holder member, and are fixed to the pivot 48 using the small screws 49. The pivot 48 with the exhaust valves 40 is fitted into the cavity 45 having a cross section in the shape of an arc and is formed at the upper edges of the exhaust ports on the cylinder block 24. The holder member 46 is bolted at its flange and attached to the cylinder block 24. The exhaust manifold 41 and the holder member 46 are then fastened to the cylinder block 24.

Since the exhaust control valves 40 are sub-assembled to the holder member 46, the flat part of the holder member 46 is brought into contact with the cylinder block 24 and is bolted to it. This facilitates reliable attachment of the exhaust control valves 40 to the cylinder block 24 in the limited space. Further, the exhaust manifold 91 is attached to the flat part of the holder member 46, and is then bolted to the cylinder block 24. This arrangement forms the cooling water path to the water jacket 90 of the holder member by making the through-holes 91 and 93 communicative.

The present invention is described with respect to the two-cycle engine applied to the small jet propelled boat operated by the rider sitting astride the seat. However, the invention is also applicable to two-cycle engines for motorcycles or the like.

In the foregoing embodiment, the described engine comprises a plurality of cylinders which are arranged in parallel with one another, and performs combustion under the active and hot ambience using the exhaust control valves. Alternatively, the invention is applicable to any type of two-cycle engines that control the open area of the exhaust ports, regardless of the number of cylinders.

According to the present invention, the exhaust control valves are housed in the cavity formed at the upper edges of the exhaust ports on the cylinder block. The exhaust control valves are pivotally supported by the holder member that is interposed via its flange between the cylinder block and the exhaust pipe. Therefore, the exhaust control valves can be easily attached to the cylinder block without a complicated process of forming bearings on the cylinder block.

Complicated parts such as bearings can be collectively and precisely formed on the independent and small holder member, which is effective in assuring the reliable exhaust control of the exhaust control valves. Further, the water jacket can be easily formed in the holder member, that promotes effective cooling of the bearings for the exhaust control valves exposed to very hot exhaust gases.

In the engine having a plurality of juxtaposed cylinders, the exhaust passages are formed downwardly, which can simplify the structure for supporting the exhaust control valves on the pivot extending across the exhaust passages, and prevent the remaining lubricating oil discharged to the exhaust pipe from returning to the cylinders.

A jet-propelled boat according to the invention will be described with reference to an embodiment shown in FIGS. 12–14.

Figure 12:
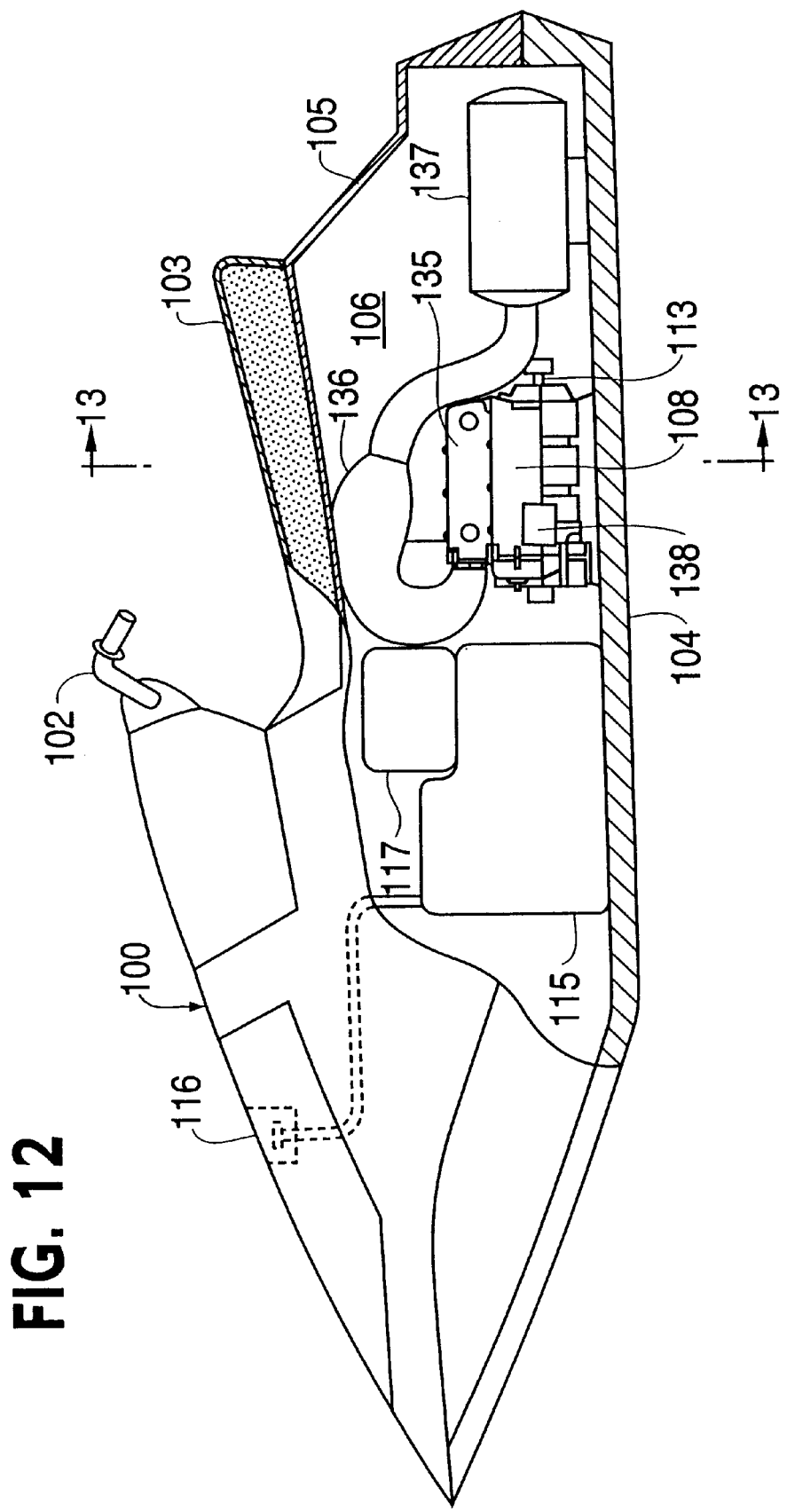
FIG. 12 is a side, partly cross sectional view, of the jet-propelled boat according to the embodiment of the invention.

In FIG. 1, a jet-propelled boat 1 is shown as being exploded along the center line thereof, while in FIG. 12, the boat 100 is shown as being exploded slightly off of the center line thereof.

The jet-propelled boat 100 includes a two-cycle, three-cylinder engine 108 housed in a space 106 which is defined under a seat 103 and is substantially in the shape of an inverted cone. The engine 108 is arranged upright in the space 106 with axes of the cylinders oriented toward the apex of a bilge in the shape of an inverted cone.

Figure 13:
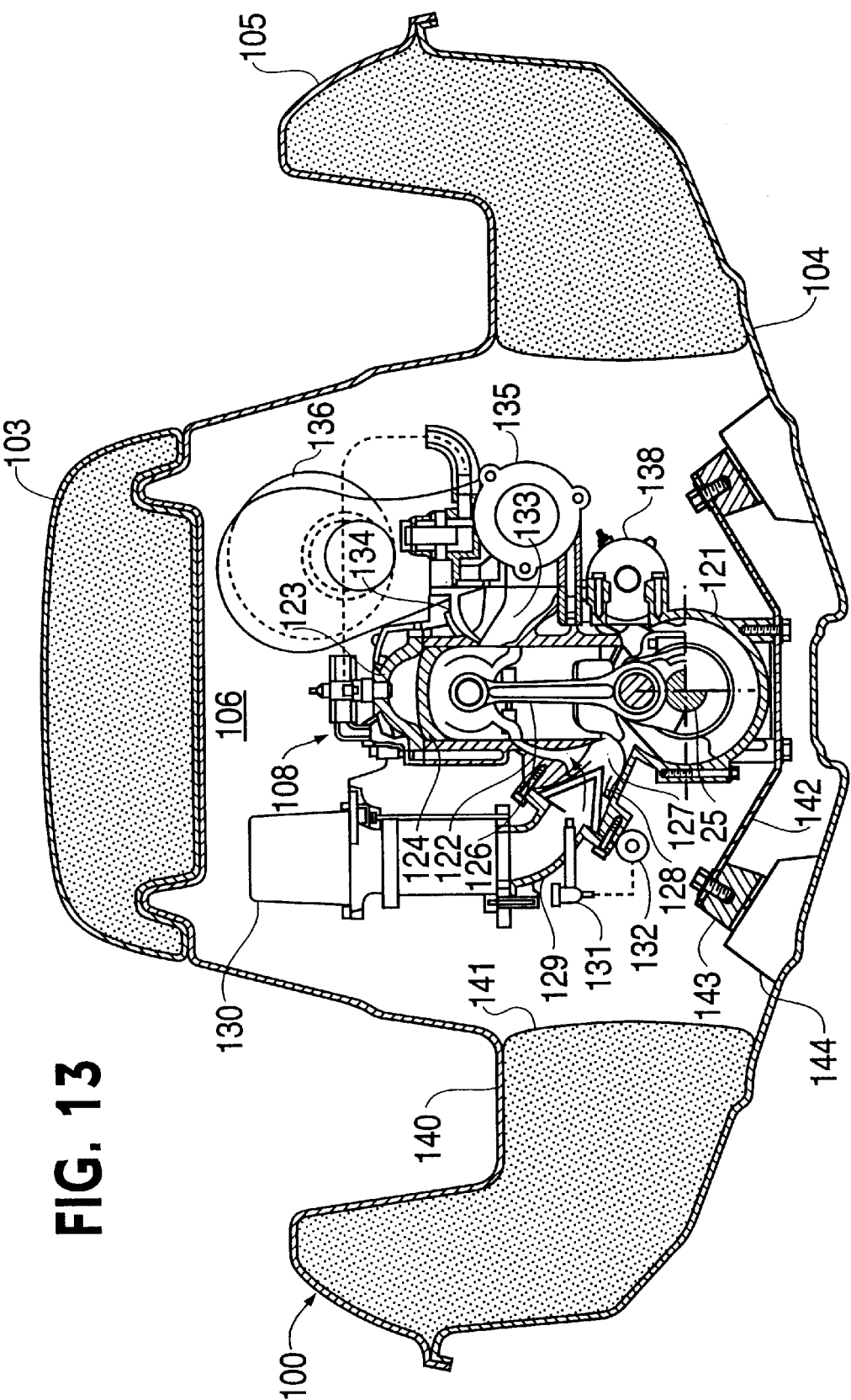
FIG. 13 is a cross sectional view observed in the direction along line 13—13 in FIG. 12.
Figure 14:
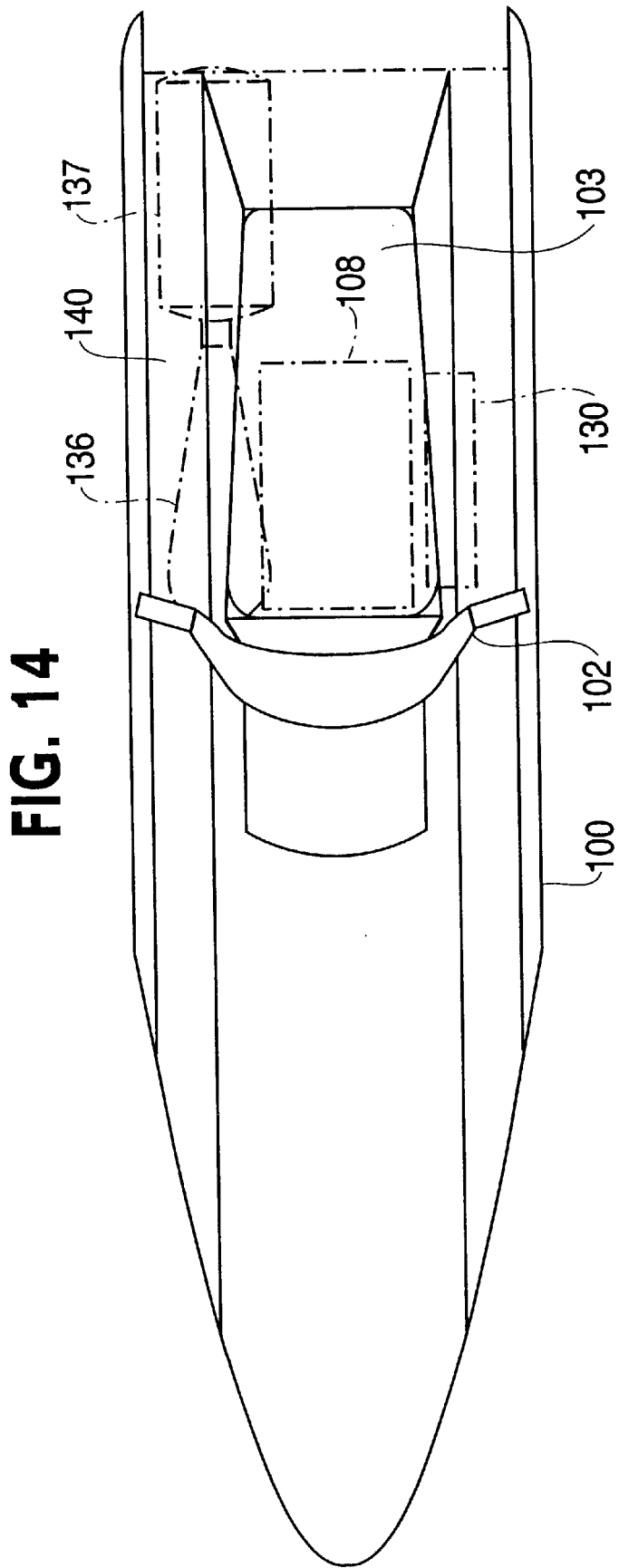
FIG. 14 is a top plan view of the jet-propelled boat according to the invention.

Referring to FIG. 13, footrests 140 are defined by an upper panel 105, at the bottom of the seat 103. Floats 141 are housed in the space 106, at areas defined by the upper panel 105 and a lower panel 104 under the footrests 141. Thus, the space 106 for housing a power unit is defined, at its top, bottom and sides, by the seat 103, the bilge in the shape of an inverted cone, and the floats 141.

The engine 108 includes three cylinders arranged in parallel with one another, and a crankshaft extending forwardly and rearwardly along the length of the boat 100. The engine 108 is mounted in the boat 100 in the following manner. A cylinder block 122 and a cylinder head 123 are stacked on a crankcase 121 one on top of the other in order to form one integral unit. The crankcase 121 is attached to an engine hanger 142, which is engaged via a mounting block 143 with bosses 144 formed on the lower panel.

Pistons 124 are slidably fitted in three cylinder holes on the cylinder block 122 of the engine 108. Each piston 124 is coupled to the crankshaft 125 via a connecting rod 126. The crankshaft 125 is rotated in response to the upward and downward movements of the pistons 124 so that the rotating force of the crankshaft 125 is transmitted from the output shaft 113 in order to rotate an impeller 111.

Air intake ports 127 are formed on one side of the cylinder block 122 (i.e., on the left side in FIG. 13), and are provided for the respective cylinders. The air intake ports 127 include reed valves 128. An air intake pipe 129 is connected to the air intake ports 127, and to an air cleaner 130 via throttle valves (not shown). Further, the air intake pipe 129 is provided with a fuel ejector 131 which ejects fuel supplied, under pressure, by the fuel pump 132 from the fuel tank 115.

The operation of a throttle lever (not shown) connected to the steering handle 102 controls an opening amount of the throttle valves, and allows the air from the air cleaner 130 to be supplied to the air intake ports 127 via the air intake pipe 129. The fuel is ejected from the fuel ejector 131 into the foregoing air, so that an air-fuel mixture is supplied to the crankcase 121.

The air intake ports 127 are oriented downwardly towards the crankcase 121. The relatively large air cleaner 130 is arranged near the cylinder block 122 above the air intake pipe 129 (i.e., near the upper left side in FIG. 13). In other words, the air intake ports 127 and the air cleaner 130 are connected via the air intake pipe 129. The fuel pump 132 is attached to the lower end of the cylinder block 122 using a bracket (not shown), and is positioned near the side of the crankcase 121 (i.e., near the lower left side in FIG. 13).

The large air cleaner 130 occupies the large upper area of the space 6 near the cylinder block 122, while the small fuel pump 132 occupies a small lower area of the space 106 near the crankcase 121. Incidentally, the space 106 is defined under the seat 103 and is in the shape of an inverted cone. Although not shown, the engine control unit, and an electrical control system for controlling ignition timing of the engine 108 are arranged together with the fuel pump 132 near the side of the crankcase 121.

Exhaust ports 133 are positioned on the other side of the cylinder block 122 (i.e., on the right side in FIG. 13) for the respective cylinders, and include exhaust control valves 134 therein. The exhaust control valves 134 are positioned near an exhaust outlet, and are made to swing by a drive control mechanism (not shown) in accordance with the jet propelling force of the boat. The exhaust control valves 134 control the open areas of the exhaust ports 133 in order that the exhaust ports 133 can discharge exhaust gases most efficiently in accordance with the operation of the engine. Thus, it is possible to prevent the air-fuel mixture from blowing through combustion chambers, to improve fuel economy, and promote exhaust gas purification.

The exhaust ports 133 are connected to an exhaust manifold 135, and are collectively connected to an exhaust chamber 136 via the exhaust manifold 135. The exhaust chamber 136 is connected to a muffler 137 at the rear end of the space 106. Exhaust gases from the exhaust ports 133 are discharged out of the boat 100 via the exhaust manifold 135, exhaust chamber 136, muffler 137, and exhaust outlet (not shown).

In this embodiment, the exhaust manifold 135 opens towards the bow (to the left in FIG. 12), and the exhaust chamber 136 is connected to an open end of the exhaust manifold 135. The exhaust chamber 136 is formed upwardly, and then extends rearwardly to come into contact with the muffler 137. In other words, the relatively large exhaust chamber 136 is disposed near the other side (i.e., at the right side in FIG. 13) of the cylinder block 122.

The starting motor 138 is attached to the bottom of the cylinder block 122 under the exhaust chamber 136, using a bracket, and activates and rotates the crankshaft 125 in order to operate the engine 108.

The foregoing arrangement means that the starting motor 138 is positioned near the other side of the crankcase 121 (i.e., at the right side in FIG. 13). Therefore, the relatively large exhaust chamber 138 is positioned near the upper part of the cylinder block 122 in the space 106 having the shape of an inverted cone, while the relatively small starting motor 138 is positioned near the relatively small crankcase 121. In other words, the exhaust chamber 136 occupies a large area in the space 106, while the starting motor 138 occupies a small area therein.

In the space 106, the intake system such as the air cleaner 130 and so on and the exhaust system such as the exhaust chamber 136 and so on are arranged on opposite sides of the cylinder block 122. Further, the engine control unit, starting motor 138, and fuel pump 132 are arranged on the opposite sides of the crankcase 121. Thus, the space 106 has a limited capacity and is efficiently utilized to house the foregoing systems and accessories. The exhaust chamber 136 that becomes relatively hot is located above the fuel pump 132 and the engine control unit. This arrangement is effective in minimizing the possibility of the fuel pump 132 and the engine control unit being affected by the convection of heat.

The fuel pump 132 and the engine control unit are disposed below the exhaust system such as the exhaust chamber 136 in order to be protected them against heat from the exhaust system. Further, in the present invention, the fuel pump 132 and the engine control unit, and the exhaust chamber 136 are arranged on opposite sides of the engine 108, i.e., these members are disposed, in a staggered state with the engine 108 sandwiched therebetween. This is effective in preventing the fuel pump 132 and the engine control unit from being directly exposed to heat radiated from the exhaust chamber 136.

The foregoing jet-propelled boat is driven by the operator sitting astride the seat 103 with his or her feet positioned on the footrests 140.

The engine 108 is activated by the starting motor 138 that is started by the operator's turning on a switch (not shown). The engine 108 repeatedly performs the two-stroke processes as follows. The air-fuel mixture introduced into the crankcase 121 via the air intake ports 127 is supplied to the combustion chambers via scavenging ports in response to the downward movement of the pistons 124. The air-fuel mixture is compressed in response to the upward movement of the pistons 124 and is ignited and burnt. Burnt gases are then scavenged via the exhaust ports 133 in response to the downward movement of the pistons 124.

The impeller 111 is rotated by rotating force transmitted from the output shaft 113 of the engine 108, so that the boat 100 is propelled forward by water which is introduced via the water inlet 109 and is ejected, in a gush, via the jet nozzle 110.

An angle of a steering blade (not shown) is changed by the operation of the steering handle 102, so that the steering blade changes an ejecting direction of the water to vary the travelling direction of the boat 1.

The jet-propelled boat comprises the power unit which includes the engine 108 and its accessories neatly packed in the space 106 defined under the seat 103, and assures a good steering feeling and mobility which are essential to such a jet-propelled boat.

The present invention has been described with respect to a jet-propelled boat having a two-cycle engine. However, the invention is also applicable to a jet-propelled boat having a four-cycle engine. The type of the engine is not essential to the present invention.

Further, the invention is applicable to any type of boat, a screw-propelled boat, propelling system, etc.

According to the invention, the air intake system such as the air cleaner and the exhaust system such as the exhaust pipe are arranged near the opposite sides of the cylinder block. Further, the small accessories such as the starting motor and fuel pump are arranged near the opposite sides of the crankcase. Therefore, the power unit can be neatly arranged in the space in the shape of an inverted cone and positioned under the seat. The jet-propelled boat having the foregoing structure can assure good steering feeling and mobility that are essential to such a jet-propelled boat. Further, the fuel tank and the engine control unit are protected against heat from the exhaust system, which enables the fuel supply system and the electric control system to reliably perform their predetermined functions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A two-cycle engine including exhaust control valves positioned at upper edges of exhaust ports formed in a cylinder block and varying open areas of exhaust ports comprising:

a cavity formed in said cylinder block for receiving said exhaust control valves at positions corresponding to upper edges of said exhaust ports;

a holder member interposed between said cylinder block and an exhaust pipe communicating with said exhaust ports;

a pivot for supporting said exhaust control valves;

a flange for connecting said holder member to said cylinder block and said exhaust pipe; and a plurality of cylinders arranged in parallel to one another wherein the pivot attached to said holder member extends across exhaust passages of respective cylinders between said exhaust ports and said exhaust pipe, the exhaust passages are formed downwardly in order to circumvent the pivot, and the exhaust control valves of the respective cylinders are commonly supported by the pivot.

2. The two-cycle engine according to claim 1, wherein said cavity is formed in an arcuate shape for accommodating said exhaust control valve for movement to a position displaced from said exhaust port for opening said exhaust port, to positions for partially closing said exhaust port and to a position for fully closing said exhaust port.

3. The two-cycle engine according to claim 1, wherein said holder is formed in an arcuate shape for accommodating said exhaust control valve for movement to a position displaced from said exhaust port for opening said exhaust port, to positions for partially closing said exhaust port and to a position for fully closing said exhaust port.

4. The two-cycle engine according to claim 1, wherein said exhaust control valve includes a pair of plates substantially in the shape of a sector and a valve plate having a cross section in the shape of an arc, said exhaust control valve being operatively connected to said pivot for imparting rotation thereto.

5. The two-cycle engine according to claim 2, wherein said exhaust control valve includes a pair of plates substantially in the shape of a sector and a valve plate having a cross section in the shape of an arc, said exhaust control valve being operatively connected to said pivot for imparting rotation thereto.

6. The two-cycle engine according to claim 2, wherein said exhaust control valve includes a pair of plates substantially in the shape of a sector and a valve plate having a cross section in the shape of an arc, said exhaust control valve being operatively connected to said pivot for imparting rotation thereto.

7. The two-cycle engine according to claim 1, and further including a water jacket surrounding said exhaust pipe and being disposed adjacent to said holder member for cooling said holder member and said pivot during operation of the two-cycle engine.

8. The two-cycle engine according to claim 1, wherein said exhaust passages are defined at least by a curved portion of said holder member.

9. An exhaust control valve for use in a two-cycle engine having an exhaust port formed in a cylinder block comprising:

an exhaust control valve adapted to be positioned at upper edges of said exhaust port;

a holder member adapted to be interposed between said cylinder block and an exhaust pipe in communication with said exhaust port;

a pivot for supporting said exhaust control valve; and a member for connecting said holder member to said cylinder block and said exhaust pipe, wherein said exhaust control valve being operatively connected with said pivot and said holder member for selective movement to a position of at least one of restricting the opening of said exhaust port and closing said exhaust port, said pivot attached to said holder member extending across an exhaust passage of the cylinder of the engine and between said exhaust port and said exhaust pipe, said exhaust passage formed downwardly in order to circumvent said pivot.

10. The exhaust control valve according to claim 9, wherein a plurality of exhaust control valves are arranged in parallel to one another, the pivot attached to the holder member extending across exhaust passages of respective cylinders of the engine and between exhaust ports and the exhaust pipe, exhaust passages are formed downwardly in order to circumvent the pivot, and the exhaust control valves of the respective cylinders commonly supported by the pivot.

11. The exhaust control valve according to claim 9, and further including a cavity in a cylinder block of the engine formed in an arcuate shape for accommodating said exhaust control valve for movement to a position displaced from said exhaust port for opening said exhaust port, to positions for partially closing said exhaust port and to a position for fully closing said exhaust port.

12. The exhaust control valve according to claim 9, wherein said holder is formed in an arcuate shape for accommodating said exhaust control valve for movement to a position displaced from said exhaust port for opening said exhaust port, to positions for partially closing said exhaust port and to a position for fully closing said exhaust port.

13. The exhaust control valve according to claim 9, wherein said exhaust control valve includes a pair of plates substantially in the shape of a sector and a valve plate having a cross section in the shape of an arc, said exhaust control valve being operatively connected to said pivot for imparting rotation thereto.

14. The exhaust control valve according to claim 11, wherein said exhaust control valve includes a pair of plates substantially in the shape of a sector and a valve plate having a cross section in the shape of an arc, said exhaust control valve being operatively connected to said pivot for imparting rotation thereto.

15. The exhaust control valve according to claim 12, wherein said exhaust control valve includes a pair of plates substantially in the shape of a sector and a valve plate having a cross section in the shape of an arc, said exhaust control valve being operatively connected to said pivot for imparting rotation thereto.

16. The exhaust control valve according to claim 9, and further including a water jacket surrounding said exhaust pipe and being disposed adjacent to said holder member for cooling said holder member and said pivot during operation of the two-cycle engine.

17. The two-cycle engine according to claim 9, wherein said exhaust passage is defined at least by a curved portion of said holder member.

* * * * *